(12) United States Patent
Lonsberry

(10) Patent No.: US 6,248,473 B1
(45) Date of Patent: Jun. 19, 2001

(54) COMPOSITE COVER FOR A BATTERY

(75) Inventor: Glenn R. Lonsberry, Avon Lake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 08/900,457

(22) Filed: Jul. 25, 1997

(51) Int. Cl.$^7$ ..................................................... H01M 2/02
(52) U.S. Cl. ........................ 429/169; 429/168; 429/167; 429/163; 429/164; 429/166
(58) Field of Search ..................................... 429/178–182

(56) References Cited

U.S. PATENT DOCUMENTS

| | | |
|---|---|---|
| 2,411,272 | 11/1946 | Keller . |
| 3,701,689 | 10/1972 | Karobath et al. . |
| 4,002,808 | 1/1977 | Fafa . |
| 4,079,172 | * 3/1978 | Potts et al. ............................... 429/54 |
| 4,084,045 | 4/1978 | Kegelman . |
| 4,726,779 | 2/1988 | Costenoble et al. . |
| 5,173,371 | * 12/1992 | Huhndorff et al. ...................... 429/1 |
| 5,464,705 | * 11/1995 | Wainwright ............................. 429/61 |
| 5,501,924 | * 3/1996 | Swierbut et al. ..................... 429/224 |
| 5,585,207 | * 12/1996 | Wakabe et al. ...................... 429/178 |

FOREIGN PATENT DOCUMENTS

| | | |
|---|---|---|
| 973083 | 2/1951 | (FR) . |
| 1097049 | 6/1955 | (FR) . |
| 2104613 | 4/1972 | (FR) . |
| 2262415 | 9/1975 | (FR) . |
| 2342561 | 9/1977 | (FR) . |
| 2680132 | 2/1993 | (FR) . |
| 740218 | 11/1955 | (GB) . |

* cited by examiner

Primary Examiner—Maria Nuzzolillo
Assistant Examiner—Mark Ruthkosky
(74) Attorney, Agent, or Firm—Russell H. Toye, Jr.

(57) ABSTRACT

An electrochemical cell of the present invention includes a composite cover assembly for the closed end of the cylindrical can of the electrochemical cell. The composite cover includes an electrically conductive contact terminal having a diameter substantially smaller than the diameter of the cylindrical can, and a flexible disk-shaped label that covers the portion of the surface of the closed end of the can that is not covered by the contact terminal. By using a smaller contact terminal, the gap 19 (FIGS. 1 and 2) provided between the positive cover 17 and the closed end 14 of can 15 to accommodate cell bulging in the conventional construction, may be substantially eliminated and the length of the can may be increased without exceeding the standards established for overall battery length. Thus, more active ingredients may be contained in the can, thereby increasing the service life of the electrochemical cell.

36 Claims, 2 Drawing Sheets

COMPOSITE COVER FOR A BATTERY

BACKGROUND OF THE INVENTION

The present invention generally relates to a battery cell construction, and more particularly relates to a positive cover for an alkaline battery cell.

Current alkaline batteries are typically constructed in the manner shown in FIGS. 1 and 2. Specifically, alkaline battery 10 includes a steel can 15 having a cylindrical shape with one open end. A metalized, plastic film label (not shown) is formed about the exterior surface of steel can 15 except for the ends of steel can 15. At a closed end 14 of steel can 15 is a positive cover 17 preferably formed of plated steel. A cathode 20, preferably formed of a mixture of manganese dioxide, graphite, potassium hydroxide solution, deionized water, and a TEFLON™ solution, is formed about the interior side surface of steel can 15. A separator 30, which is preferably formed of a non-woven fabric that prevents migration of any solid particles in the battery, is disposed about the interior surface of cathode 20. An electrolyte formed of potassium hydroxide, is disposed in the interior of separator 30. An anode 50, preferably formed of zinc powder, a gelling agent, and other additives, is disposed within an electrolyte in contact with a current collector 60, which may be formed of brass. Current collector 60 contacts a brass rivet 70 projecting through a nylon seal 71 formed at the open end of steel can 15 to prevent leakage of the active ingredients contained in steel can 15. Nylon seal 71 contacts a metal washer 72 and an inner cell cover 74, which is preferably formed of steel. A negative cover 75, which is preferably formed of a plated steel, is disposed in contact with inner cell cover 74 and brass rivet 70. Rivet 70 contacts current collector 60 through a hole formed in nylon seal 71. Negative cover 75 is electrically insulated from steel can 15 by nylon seal 71.

Positive cover 17 includes a protruding nub 18 at its center which forms the positive contact terminal of the battery. As shown in FIG. 1, positive cover 17 has a diameter that is substantially equal to the diameter of cylindrical steel can 15. Positive cover 17 contacts the closed end 14 of steel can 15 about its peripheral edge. Because the cell may bulge during storing, discharge, etc. and because positive cover 17 is rigid and inflexible, a gap 19 is provided between the inner surface of positive cover 17 and the exterior surface of closed end 14 of approximately 0.022 inch to allow for such bulging. The positive cover 17 can be fastened to the container by welds 42 after the cathode is rammed into place.

As shown in FIG. 2, positive cover 17 further includes a reinforcing rib 16, which protrudes outward about a peripheral edge of cover 17. In the assignee's current design, this reinforcing rib protrudes a little more than 0.042 inch from the outer surface of the closed end 14 of can 15. Further, the outer surface of positive contact terminal 18 extends an additional 0.090 inch from the outer surface of reinforcing rib 16 in the current design.

A primary goal in designing alkaline batteries is to increase the service performance of the cell. The service performance is the length of time for the cell to discharge under a given load to a specific voltage at which the cell is no longer useful for its intended purpose. One approach taken to increase service performance was to increase the interior volume of the cell in order to increase the amount of active materials within the cell. However, the commercial external size of the cell is fixed, thereby limiting the ability to increase the amount of active materials within the cell. For example, the cell length from the end of positive contact terminal 18 to the exterior surface of negative cover 75 is fixed by standards as well as the height of the protrusion that forms positive contact terminal 18.

In order to accommodate more active materials within the cell while maintaining the external size of the cell, the steel label and insulating paper tube of the original alkaline cell has been replaced with one made of thinner metalized plastic film. Thus, the steel can may be enlarged to provide a greater internal volume. By switching to a thinner plastic film label, the service performance of a typical alkaline cell was significantly increased. Another approach taken to increase the service performance of a cell is to provide for better utilization of the electrode materials. This approach is taken in U.S. Pat. No. 5,501,924 issued to Wendi Swierbut et al., which discloses utilizing tin dioxide as an additive to a cathode. Despite past increases in service performance, the need to find new ways to increase service performance remains the primary goal of cell designers.

SUMMARY OF THE INVENTION

The present invention improves the service performance of alkaline cells by further increasing the internal volume of the cell. To achieve this and other advantages, and in accordance with the purpose of the invention as embodied and broadly described herein, the present invention provides a composite cover assembly for the closed end of the cylindrical can of an electrochemical cell that includes an electrically conductive contact terminal having a diameter substantially smaller than the diameter of the cylindrical can, and a flexible disk-shaped label that covers the portion of the surface of the closed end of the can that is not covered by the contact terminal. By using a smaller contact terminal, the gap 19 (FIG. 1) provided between the positive cover 17 and the closed end 14 of can 15 to accommodate cell bulging in the conventional construction, may be substantially eliminated and the length of the can may be increased without exceeding the standards established for overall battery length. In addition, by eliminating the reinforcing rib on the positive cover, the internal cell volume may be further increased while maintaining the 0.090 inch protrusion distance of the positive contact terminal.

More specifically, the electrochemical cell of the present invention comprises a cylindrical can for containing at least an anode and a cathode, the cylindrical can having one open end and one closed end. The electrochemical cell further includes a first contact terminal assembly mounted within the open end of the cylindrical can in electrical isolation therefrom, and a protruding second contact terminal mounted in electrical contact to the closed end of the cylindrical can, the second contact terminal covering less than all of an exterior surface of the closed end of the cylindrical can. Preferably, the first contact terminal assembly is a negative contact terminal assembly that is electrically coupled to the anode and the second contact terminal is a positive contact terminal that is electrically coupled to the cathode. The electrochemical cell may further include an end cover label mounted to the exterior surface of the closed end of the cylindrical can and covering that portion of the exterior surface not covered by the second contact terminal.

These and other features, objects, and benefits of the invention will be recognized by those who practice the invention and by those skilled in the art, from reading the following specification and claims, together with reference to the accompanying drawings.

DETAILED DESCRIPTION OF PREFERRED EMBODIMENT

Figure 1:
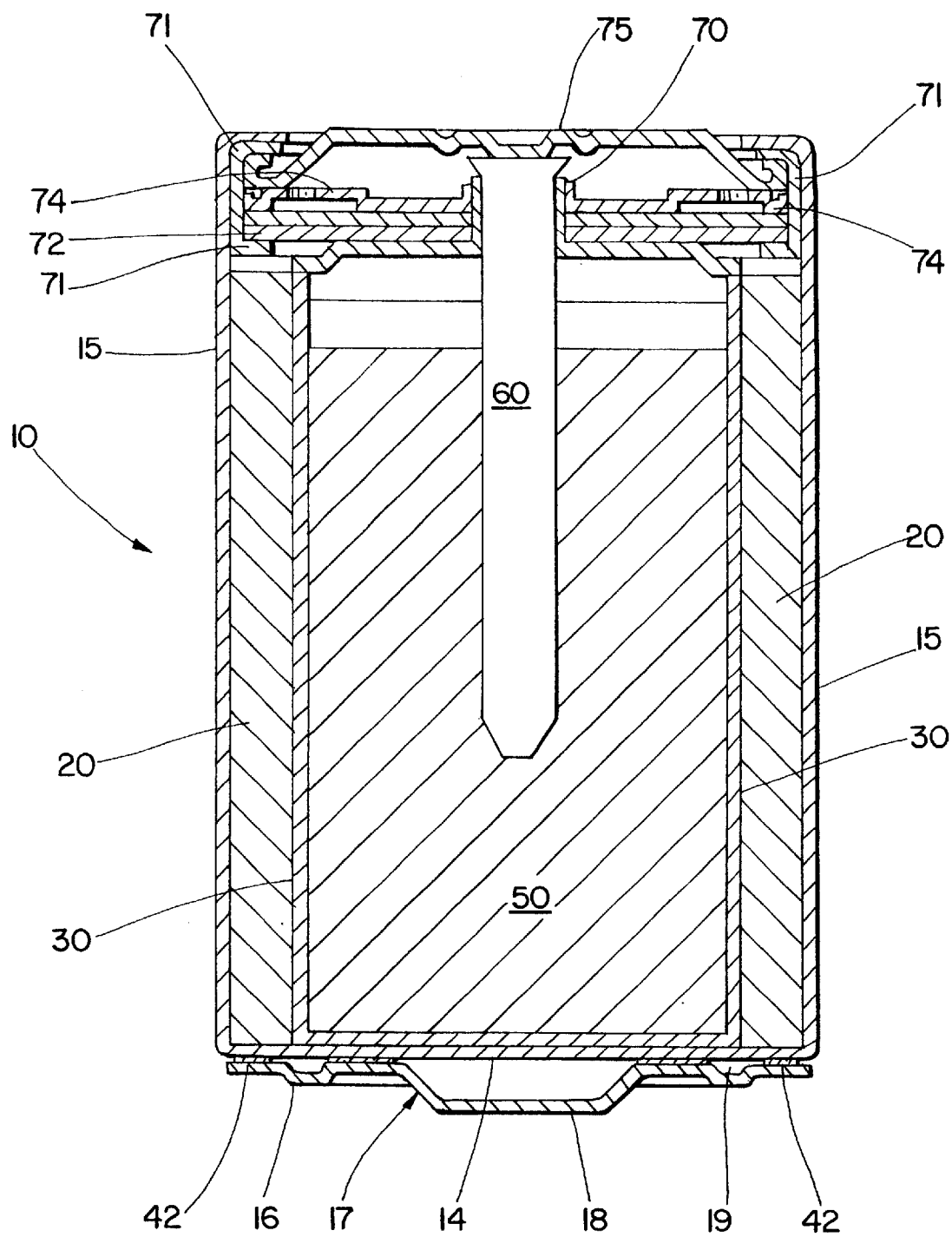
FIG. 1 is a cut-away cross-sectional view of an example of an electrochromic cell having a conventional construction.
Figure 2:
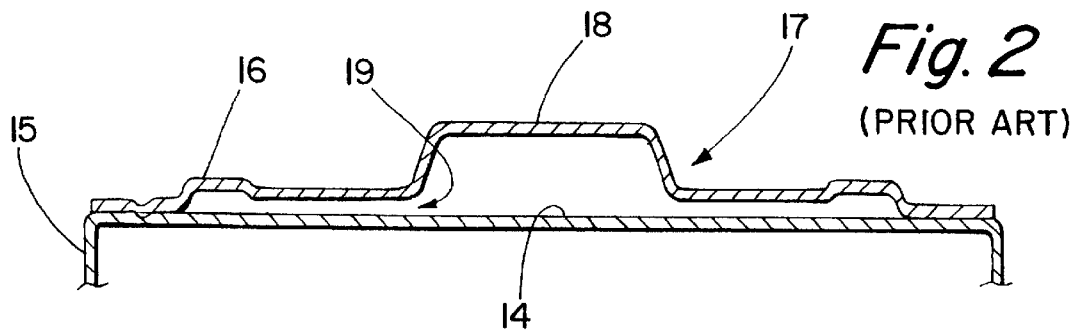
FIG. 2 is an enlarged, partial cross-sectional view of the positive cover shown in FIG. 1.
Figure 3:
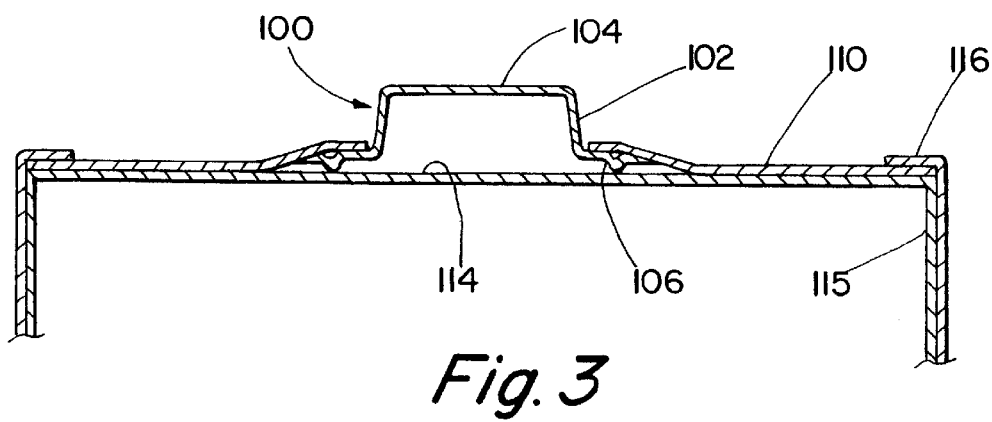
FIG. 3 is a partial cross-sectional view of a cell constructed in accordance with the present invention.
Figure 4:
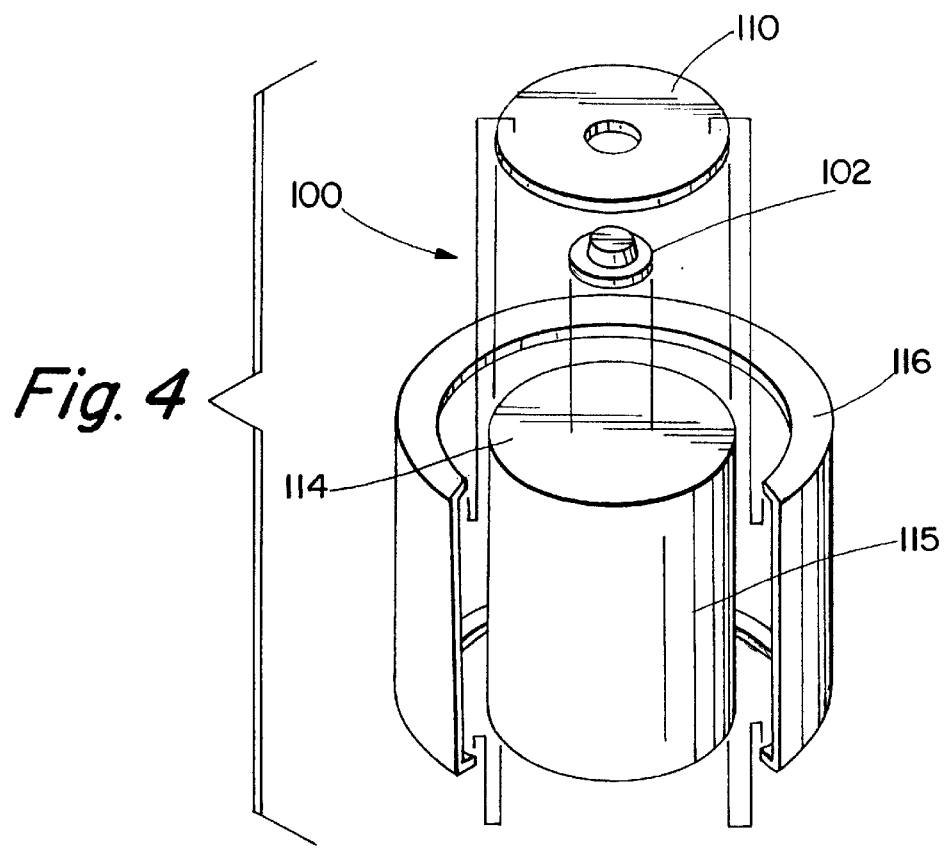
FIG. 4 is an exploded perspective view of a cell constructed in accordance with the present invention.

FIG. 3 shows a partial cut-away cross section of the composite positive cover construction 100 according to the preferred embodiment of the present invention. Composite cover 100 includes a conductive contact terminal 102 having a substantially smaller radial dimension than the conventional positive cover of the prior art, and a disk-shaped label 110 that may overlap the peripheral portion of contact terminal 102. In the preferred construction for a standard D-size cell, contact terminal 102 has a diameter of 0.563±0.002 inch.

The contact terminal 102 is formed with three weld projections 106 protruding downward from the outer surface and providing a flat of 0.015±0.0015 inch (even spaced at 120°) to provide contact through direct weldment to the closed end of can 114. By providing these projections 106, welding of contact terminal 102 to the outer closed end surface 114 of steel can 115 may be facilitated while ensuring a good electrical contact between contact terminal 102 and end 114 of steel can 115. Preferably, contact terminal 102 is formed of a nickel-plated steel, although other suitable plating materials (i.e., tin, brass, and/or gold) used for positive covers of batteries may likewise be used.

A flexible disk-shaped end cover label 110 is provided to improve the appearance of the positive end of the battery and to provide additional insulation on the edges of can surface 114 and under the overlap of label 116. End cover label 110 is preferably formed of either a metalized polyvinyl chloride or polyfilm and polypropylene with a pressure sensitive adhesive applied to the side that is secured to closed end 114 of can 115. By making end cover label 110 flexible, no gap needs to be provided between the cover label and the can to accommodate cell bulging. Further, due to the diminished size of contact terminal 102 no reinforcing rib needs to formed on contact terminal 102.

A cell constructed in accordance with the present invention is formed by conventional methods except that the smaller diameter contact terminal 102 is centered on closed end 114 and welded thereto, followed by a step of applying disk-shaped end cover label 110 over closed end 114 before external peripheral label 116 is applied such that the edges of label 116 will extend over the periphery of disk-shaped end cover label 110.

By substantially reducing the diameter of positive contact terminal 102 and eliminating the 0.022 inch gap that exists between the conventional positive cover and the exterior surface of the closed end of the steel can as well as the 0.020 inch reinforcing rib, the length of the steel can may be increased by at least 0.042 inch without increasing the overall external length of the cell to thereby increase the internal volume of the cell. Thus, more active ingredients may be contained within the cell thereby improving the service performance of the cell. Further, the use of the smaller diameter positive contact terminal 102 results in a lower cost for the positive cover and a lower overall cost due to the lower cost of the disk-shaped end cover label 110 relative to the larger plated steel positive cover. Also, by providing a label on the positive end of the battery, various labeling indicia may be printed on a portion of the battery that was not previously used for such a purpose. Yet another advantage of providing a label on the positive end of the battery is to accommodate a portion of a battery testing label, such as an electrochromic or thermochromic testing label. By locating the battery testing label and contact switches to the positive end of the battery, the tester will become substantially easier to use by consumers and will be more visible both during store merchandising and in use by consumers. This construction of a tester label will also be substantially cheaper.

As stated above, the preferred diameter of positive cover cap 102 for a D-size cell is approximately 0.563 inch thus covering an area of 0.249 square inch. Given the maximum D-size cell diameter of 1.344 inches and an end area of 1.419 square inches, the positive contact terminal 102, according to the present invention, covers less than 18 percent of the exterior surface of closed end 114 of can 115 and has a diameter generally less than 25 percent of the diameter of can 115. Although preferred dimensions are stated above for a D-size cell, other dimensions may be employed, provided the resulting cell does not exceed the maximum or minimum external dimension thresholds established by current standards. By making the diameter of positive contact terminal 102 as small as possible, the amount of gap needed between the positive cover and the closed end of the steel can to accommodate bulging may also be minimized. Also, although the present invention is most suitable for D- and C-size cells, the concepts underlying the invention may be employed in batteries of any size.

Although the composite cover assembly of the present invention has been described above as a positive cover assembly for an alkaline battery, it will be appreciated by those skilled in the art that it may be used as either a positive or negative cover for different types of cell constructions.

It will be understood by those who practice the invention and by those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electrochemical cell comprising:
   a cylindrical can for containing at least an anode and a cathode, said cylindrical can having one open end, one closed end, and side walls extending therebetween;
   a first contact terminal assembly mounted within the open end of said cylindrical can in electrical isolation therefrom;
   a protruding second contact terminal mounted in electrical contact to the closed end of said cylindrical can; and
   a label substrate applied to the exterior surface of the side walls and having an edge that extends over a peripheral area of the closed end of said cylindrical can,
   wherein said second contact terminal covers less than all of an exterior surface of the closed end of said cylindrical can and does not extend under the edge of said label substrate that extends over the peripheral area of the closed end of said cylindrical can.

2. The electrochemical cell as defined in claim 1, wherein said first contact terminal assembly is a negative contact terminal assembly that is electrically coupled to said anode and said second contact terminal is a positive contact terminal that is electrically coupled to said cathode.

3. The electrochemical cell as defined in claim 1 and further including an end cover label mounted to the exterior surface of the closed end of said cylindrical can and covering that portion of the exterior surface not covered by said second contact terminal.

4. The electrochemical cell as defined in claim 3, wherein said positive cover label is made of a metalized plastic material.

5. The electrochemical cell as defined in claim 1, wherein said second contact terminal is round and is mounted concentrically on the closed end of said cylindrical can.

6. The electrochemical cell as defined in claim 5, wherein the diameter of said second contact terminal is generally less than 25 percent of the diameter of said cylindrical can.

7. A battery comprising:
a cylindrical can for containing at least an anode and a cathode, said cylindrical can having one open end and one closed end;
a negative terminal assembly mounted within the open end of said cylindrical can in electrical isolation therefrom, said negative terminal assembly being coupled to said anode;
a protruding positive contact terminal mounted in electrical contact to the closed end of said cylindrical can; and
a label substrate covering the sides of said cylindrical can and including an edge that covers a peripheral area of the closed end of said cylindrical can,
wherein said positive contact terminal covers less than all of an exterior surface of the closed end of said cylindrical can such that the positive contact terminal does not extend under the edge of said label substrate that covers the peripheral area of the closed end of said cylindrical can.

8. The battery as defined in claim 7 and further including a positive cover label mounted to the exterior surface of the closed end of said cylindrical can and covering that portion of the exterior surface not covered by said positive contact terminal.

9. The battery as defined in claim 8, wherein said edge of said label substrate overlaps a peripheral edge of said positive cover label.

10. The battery as defined in claim 8, wherein said positive cover label is made of a metalized plastic material.

11. The battery as defined in claim 7, wherein said battery is an alkaline battery.

12. The battery as defined in claim 7, wherein said positive contact terminal is round and is mounted concentrically on the closed end of said cylindrical can.

13. The battery as defined in claim 12, wherein the diameter of said positive contact terminal is generally less than 25 percent of the diameter of said cylindrical can.

14. The battery as defined in claim 7, wherein said positive contact terminal is formed of nickel-plated steel.

15. A contact terminal for a battery having a cylindrical can for containing at least an anode and a cathode, the cylindrical can having at least one closed end, the battery including a label substrate that covers the sides of the cylindrical can and covers a peripheral region of the closed end of the cylindrical can, said contact terminal comprising:
an electrically conductive substrate having a peripheral zone adapted for mounting said conductive substrate to a closed end of the cylindrical can, said conductive substrate covering less than all of an exterior surface of the closed end of the cylindrical can such that said conductive substrate does not extend over the peripheral region of the closed end that is covered by the label substrate.

16. The contact terminal as defined in claim 15, wherein said conductive substrate includes a protruding surface for providing a positive contact surface.

17. The contact terminal as defined in claim 15, wherein said conductive substrate is formed of nickel-plated steel.

18. The contact terminal as defined in claim 15, wherein said conductive substrate is round and is mounted concentrically on the closed end of said cylindrical can.

19. The contact terminal as defined in claim 18, wherein the diameter of said conductive substrate is generally less than 25 percent of the diameter of the cylindrical can.

20. The contact terminal as defined in claim 15, wherein said conductive substrate includes an annular ridge extending from a bottom surface of said conductive substrate for contacting the exterior surface of a closed end of the cylindrical can.

21. A composite cover for an end of a battery having a cylindrical can for containing an anode and a cathode, said composite cover comprising:
a contact terminal mounted on a closed end of the cylindrical can and covering less than all of the surface area of an exterior surface of the closed end; and
a disk-shaped cover label mounted to the same closed end of the cylindrical can to cover a portion of the exterior surface of the closed end that is not covered by said contact terminal, said cover label having an opening for exposing said contact terminal.

22. The composite cover as defined in claim 21, wherein said disk-shaped cover label has a diameter substantially equal to the diameter of the cylindrical can.

23. The composite cover as defined in claim 21, wherein said contact terminal includes a protruding surface for providing a positive contact surface.

24. The composite cover as defined in claim 21, wherein said contact terminal is round and is mounted concentrically on the closed end of the cylindrical can.

25. The composite cover as defined in claim 24, wherein the diameter of said contact terminal is generally less than 25 percent of the diameter of the cylindrical can.

26. A battery comprising:
a cylindrical can for containing at least an anode and a cathode, said cylindrical can having one open end and one closed end;
a first cover terminal assembly mounted within the open end of said cylindrical can in electrical isolation therefrom;
a second cover terminal assembly mounted on the exterior surface of the closed end of said cylindrical can, said second cover terminal covering less than all of the exterior surface of the closed end of said cylindrical can; and
a disk-shaped cover label disposed on the exterior surface of the closed end of said cylindrical can so as to cover the portion of the exterior surface of the closed end that is not covered by said second cover terminal.

27. The battery as defined in claim 26, wherein said disk-shaped cover label is mounted over a portion of said second cover terminal assembly.

28. The electrochemical cell as defined in claim 1, wherein said cylindrical can is electrically conductive.

29. The electrochemical cell as defined in claim 1, wherein the closed end of said cylindrical can is substantially flat.

30. The electrochemical cell as defined in claim 1, wherein the closed end of said cylindrical can is integral with the side walls of said cylindrical can.

31. The electrochemical cell as defined in claim 1, wherein said protruding second contact terminal is mounted in direct physical contact to the closed end of said cylindrical can.

32. The battery as defined in claim 7, wherein said cylindrical can is electrically conductive.

33. The battery as defined in claim 7, wherein the closed end of said cylindrical can is substantially flat.

34. The battery as defined in claim 7, wherein the closed end of said cylindrical can is integral with the side walls of said cylindrical can.

35. The battery as defined in claim 7, wherein said protruding positive contact terminal is mounted in direct physical contact to the closed end of said cylindrical can.

36. The contact terminal as defined in claim 15 wherein said electrically conductive substrate is mounted in direct physical contact with the closed end of the cylindrical can.

* * * * *